US010502050B2

(12) United States Patent
Segura Dominguez et al.

(10) Patent No.: US 10,502,050 B2
(45) Date of Patent: Dec. 10, 2019

(54) OPTICAL ROTARY JOINT IN COILED TUBING APPLICATIONS

(71) Applicant: Schlumberger Technology Corporation, Sugar Land, TX (US)

(72) Inventors: Jordi Juan Segura Dominguez, Richmond, TX (US); Michael Hayes Kenison, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 152 days.

(21) Appl. No.: 14/873,083

(22) Filed: Oct. 1, 2015

(65) Prior Publication Data

US 2017/0096892 A1   Apr. 6, 2017

(51) Int. Cl.
*E21B 47/12* (2012.01)
*E21B 19/22* (2006.01)
*E21B 17/20* (2006.01)
*G02B 6/50* (2006.01)
*G02B 6/36* (2006.01)
*G02B 6/44* (2006.01)

(52) U.S. Cl.
CPC ............ *E21B 47/12* (2013.01); *E21B 17/206* (2013.01); *E21B 19/22* (2013.01); *E21B 47/123* (2013.01); *G02B 6/50* (2013.01); *G02B 6/3604* (2013.01); *G02B 6/4416* (2013.01)

(58) Field of Classification Search
USPC ..................................................... 340/854.7
See application file for complete search history.

(56) References Cited

U.S. PATENT DOCUMENTS

| 5,485,745 A * | 1/1996 | Rademaker ........... E21B 17/203 340/854.7 |
| 5,675,674 A | 10/1997 | Weis |
| 2005/0034857 A1* | 2/2005 | Defretin .................. E21B 47/10 166/250.01 |
| 2005/0263281 A1 | 12/2005 | Lovell et al. |
| 2006/0044156 A1 | 3/2006 | Adnan et al. |

(Continued)

FOREIGN PATENT DOCUMENTS

| WO | 2011035089 A2 | 3/2011 |
| WO | 2014160737 A1 | 10/2014 |

OTHER PUBLICATIONS

International Search Report and Written Opinion issued in International Patent Application No. PCT/US2016/052731 dated Sep. 21, 2016; 23 pages.

(Continued)

*Primary Examiner* — Sean D Andrish (57) ABSTRACT

Systems and methods regarding a reel, downhole tool, control system, and rotary joint. The reel is disposed at a wellsite surface and containing coiled tubing. A first optical conductor is carried with the coiled tubing. The downhole tool is connected to the coiled tubing for conveyance within the wellbore via the coiled tubing. The control system is disposed at the wellsite surface. The rotary joint is disposed in association with the reel and transmits optical communications between the control system and at least one of the downhole tool and the coiled tubing disposed within the wellbore, via at least the first optical conductor and a second optical conductor extending at least partially between the rotary joint and the control system.

18 Claims, 5 Drawing Sheets

(56) References Cited

U.S. PATENT DOCUMENTS

2011/0139447 A1* 6/2011 Ramos ................... E21B 47/09
166/254.2
2014/0219056 A1 8/2014 Samson et al.
2015/0256033 A1 9/2015 Stone et al.

OTHER PUBLICATIONS

Examination Report issued in GC patent appl. No. 2016-32051 dated Oct. 25, 2018; 4 pages.
Extended European Search Report issued in European Patent Appl. No. 16852323.1 dated May 29, 2019; 6 pages.

* cited by examiner

OPTICAL ROTARY JOINT IN COILED TUBING APPLICATIONS

BACKGROUND OF THE DISCLOSURE

Wells are generally drilled into a land surface or ocean bed to recover natural deposits of oil and gas, as well as other natural resources that are trapped in geological formations in the Earth's crust. Wellbores may be drilled along a trajectory to reach one or more subterranean rock formations containing the hydrocarbons and other downhole fluids. Information about the subsurface formations and formation fluid, such as measurements of the formation pressure, formation permeability, and recovery of formation fluid samples, may be utilized to increase well production and to predict the economic value, the production capacity, and the production lifetime of a subsurface formation. Downhole tools, such as formation testers, may perform evaluations in real-time during sampling of the formation fluid.

In working with deeper and more complex wellbores, it becomes more likely that downhole tools, tool strings, and/or other downhole apparatus may include numerous testing, navigation, and/or communication tools, resulting in increasingly longer tool strings that consume increasingly larger quantities of electrical power to drive or otherwise energize various internal components of such downhole apparatus. Furthermore, these numerous downhole apparatus collectively generate large volumes of information, utilizing large data bandwidths to communicate the information to the wellsite surface.

Providing electrical power to and communicating with downhole tools conveyed into a wellbore via coiled tubing is complicated by the rotational motion of the coiled tubing reel, which limits the number and types of electrical power and/or data pathways available between the downhole tools and the wellsite surface. Electrical pathways support transfer of electrical power to the downhole tools, but limit data transfer bandwidth between the downhole tools and the wellsite surface. Electrical power may also be supplied to the downhole tools with batteries, which increase the cost and limit operating time of the downhole tools.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a system that includes a reel disposed at a wellsite surface and containing coiled tubing. A first optical conductor is carried with the coiled tubing for conveyance within the wellbore. The system also includes a control system disposed at the wellsite surface, and a rotary joint disposed in association with the reel and transmitting optical communications, between the control system and a portion the first optical conductor disposed in the wellbore, via at least a second optical conductor extending at least partially between the rotary joint and the control system.

The present disclosure also introduces a system that includes a reel disposed at a wellsite surface and containing coiled tubing, a downhole tool connected to the coiled tubing for conveyance within the wellbore via the coiled tubing, and a control system disposed at the wellsite surface. A rotary joint is disposed in association with the reel. The system also includes at least one first optical conductor disposed within the coiled tubing for communicating optical signals along at least one first optical path extending between the downhole tool and at least one optical pathway of the rotary joint. The system also includes at least one second optical conductor for communicating optical signals along at least one second optical path extending between the control system and the at least one optical pathway of the rotary joint.

The present disclosure also introduces a method that includes rotating a reel of coiled tubing to convey a portion of the coiled tubing within a wellbore, entering instructions into a control system disposed at a wellsite surface from which the wellbore extends, and operating a communication system to transmit optical signals between the control system and the portion of the coiled tubing disposed within the wellbore via a rotary joint and a plurality of optical conductors. The rotary joint is disposed in association with the reel and in optical communication with the plurality of optical conductors.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1:
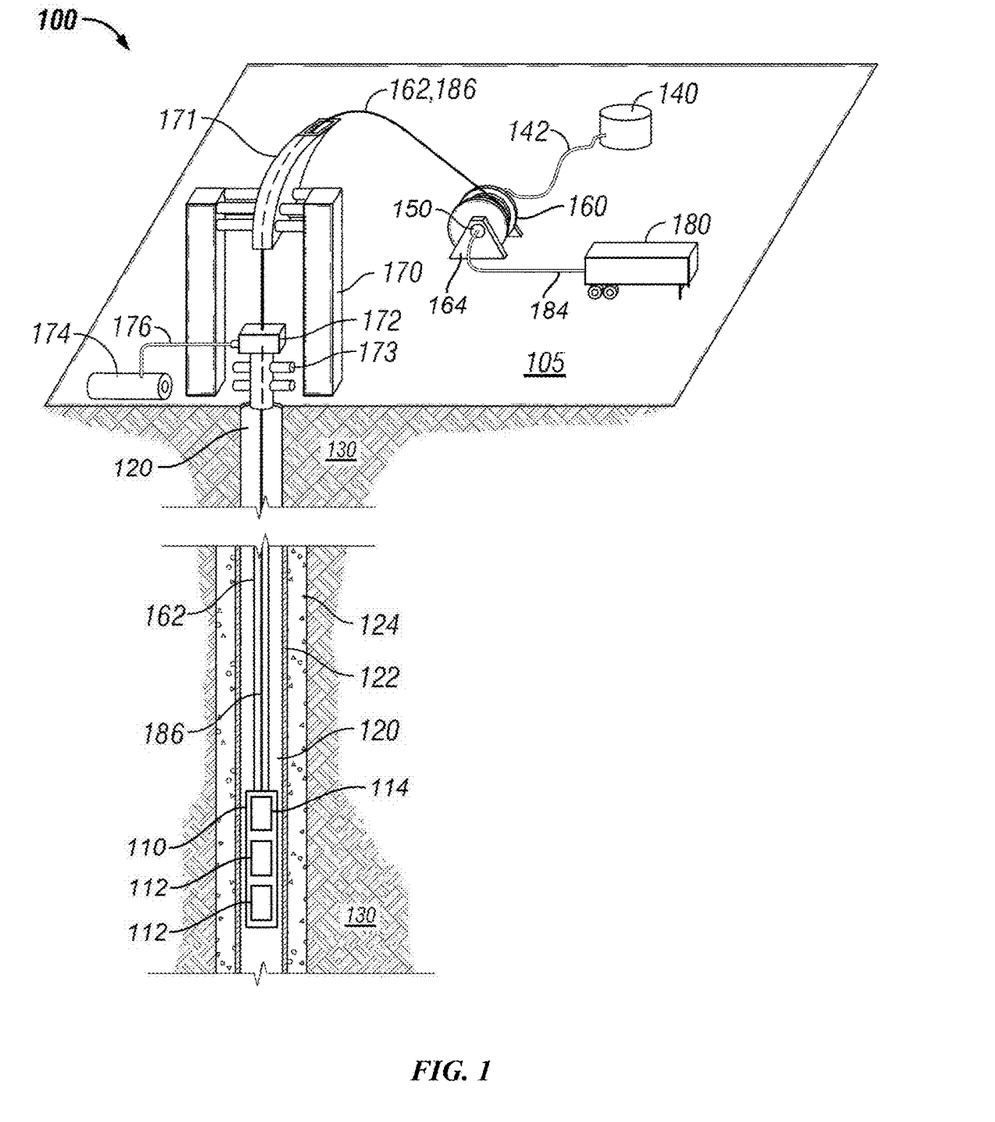
FIG. 1 is a schematic view of at least a portion of apparatus according to one or more aspects of the present disclosure.

The present disclosure relates to electrical power and optical communication systems operable to supply electrical power and establish optical communication between a wellsite surface and a downhole tool string conveyed into a wellbore via coiled tubing. FIG. 1 is a schematic view of at least a portion of an example wellsite system 100 according to one or more aspects of the present disclosure, representing an example coiled tubing environment in which one or more apparatus described herein may be implemented, including to perform one or more methods and/or processes also described herein.

FIG. 1 depicts a wellsite surface 105 upon which various wellsite equipment is disposed proximate a wellbore 120. FIG. 1 also depicts a sectional view of the Earth below the wellsite surface 105 containing the wellbore 120, as well as a tool string 110 positioned within the wellbore 120. The wellbore 120 extends from the wellsite surface 105 into one or more subterranean rock formations 130. In the context of the present disclosure, the term "subterranean rock formation" (or simply "formation") may be given its broadest possible meaning and may include, without limitation, various rocks and other natural materials, as well as cement and other artificial materials, including rock layer formations, such as, granite, basalt, sandstone, dolomite, sand, salt, limestone, rhyolite, quartzite, and shale, among others. When utilized in cased-hole implementations, a cement sheath 124 may secure a casing 122 within the wellbore 120. However, one or more aspects of the present disclosure are also applicable to open-hole implementations, in which the cement sheath 124 and the casing 122 have not yet been installed in the wellbore 120.

At the wellsite surface 105, the wellsite system 100 may comprise a control center 180 comprising processing and communication equipment operable to send, receive, and process electrical and/or optical signals. The control center 180 at least partially forms a control system operable at the wellsite to perform operations of the wellsite system 100. Thus, the control center 180 may also be referred to herein as the control system 180.

The control center 180 may further comprise an electrical power source operable to supply electrical power to components of the wellsite system 100, including the tool string 110. The electrical signals, the optical signals, and the electrical power may be transmitted between the control center 180 and the tool string 110 via conduits 184, 186 extending between the control center 180 and the tool string 110. The conduits 184, 186 may each comprise one or more electrical conductors, such as electrical wires, lines, or cables, which may transmit electrical power and/or electrical control signals from the control center 180 to the tool string 110, as well as electrical sensor, feedback, and/or other data signals from the tool string 110 to the control center 180. The conduits 184, 186 may each further comprise one or more optical conductors, such as fiber optic cables, which may transmit light pulses and/or other optical signals (hereafter collectively referred to as optical signals) between the control center 180 and the tool string 110.

The conduits 184, 186 may collectively comprise a plurality of conduits or conduit portions interconnected in series and/or in parallel and extending between the control center 180 and the tool string 110. For example, as depicted in the example implementation of FIG. 1, the conduit 184 extends between a reel 160 of coiled tubing 162 and the control center 180, such that the conduit 184 may remain substantially stationary with respect to the wellsite surface 105. The conduit 186 extends between the reel 160 and the tool string 110 via the coiled tubing 162, including the coiled tubing 162 that is spooled on the reel 160. Thus, the conduit 186 may rotate and otherwise move with respect to the wellsite surface 105. The reel 160 may be rotatably supported on the wellsite surface 105 by a stationary base 164, such that the reel 160 may be rotated to advance and retract the coiled tubing 162 within the wellbore 120. The conduit 186 may be contained within an internal passage of the coiled tubing 162, secured externally to the coiled tubing 162, or embedded within the structure of the coiled tubing 162. A rotary joint 150, such as may be known in the art as a collector, provides an interface between the stationary conduit 184 and the moving conduit 186.

The wellsite system 100 may further comprise a fluid source 140 from which fluid may be conveyed by a fluid conduit 142 to the reel 160 of coiled tubing 162. The fluid conduit 142 may be fluidly connected to the coiled tubing 162 by a swivel or other rotating coupling (obstructed from view in FIG. 1). The coiled tubing 162 may be utilized to convey the fluid received from the fluid source 140 to the tool string 110 coupled at the downhole end of the coiled tubing 162 within the wellbore 120.

The wellsite system 100 may further comprise a support structure 170, such as may include or otherwise support a coiled tubing injector 171 and/or other apparatus operable to facilitate movement of the coiled tubing 162 in the wellbore 120. Other support structures may be also included, such as a derrick, a crane, a mast, a tripod, and/or other structures. A diverter 172, a blow-out preventer (BOP) 173, and/or a fluid handling system 174 may also be included as part of the wellsite system 100. For example, during deployment, the coiled tubing 162 may be passed from the injector 171, through the diverter 172 and the BOP 173, and into the wellbore 120. The tool string 110 may be conveyed along the wellbore 120 via the coiled tubing 162 in conjunction with the coiled tubing injector 171, such as may be operable to apply an adjustable uphole and downhole force to the coiled tubing 162 to advance and retract the tool string 110 within the wellbore 120.

During some downhole operations, fluid may be conveyed through the coiled tubing 162 and may exit into the wellbore 120 adjacent to the tool string 110. For example, the fluid may be directed into an annular area between the sidewall of the wellbore 120 and the tool string 110 through one or more ports (not shown) in the coiled tubing 162 and/or the tool string 110. Thereafter, the fluid may flow in the uphole direction and out of the wellbore 120. The diverter 172 may direct the returning fluid to the fluid handling system 174 through one or more conduits 176. The fluid handling system 174 may be operable to clean the fluid and/or prevent the fluid from escaping into the environment. The fluid may then be returned to the fluid source 140 or otherwise contained for later use, treatment, and/or disposal.

Although FIG. 1 depicts the tool string 110 as a single unit or member, the tool string 110 may be or comprise one or more downhole modules, sensors, and/or tools 112. For example, the tool string 110 and/or one or more of the modules, sensors, and/or tools 112 may be or comprise at least a portion of a monitoring tool, an acoustic tool, a density tool, a drilling tool, an electromagnetic (EM) tool, a formation testing tool, a fluid sampling tool, a formation logging tool, a formation measurement tool, a gravity tool, a magnetic resonance tool, a neutron tool, a nuclear tool, a photoelectric factor tool, a porosity tool, a reservoir characterization tool, a resistivity tool, a seismic tool, a surveying tool, and/or a tough logging condition (TLC) tool. However, other downhole tools are also within the scope of the present disclosure.

One or more of the downhole modules, sensors, and/or tools 112 may also or instead be or comprise a casing collar locator (CCL) operable to detect ends of casing collars by sensing a magnetic irregularity caused by the relatively high mass of an end of a collar of the casing 122. The CCL may transmit a signal in real-time to wellsite surface equipment, such as the control center 180, via the conduits 184, 186. The CCL signal may be utilized to determine the position of the tool string 110 with respect to known casing collar numbers and/or positions within the wellbore 120. Therefore, the CCL may be utilized to detect and/or log the location of the tool string 110 within the wellbore 120.

One or more of the downhole modules, sensors, and/or tools 112 may also or instead be or comprise one or more inclination and/or other orientation sensors. Examples of such sensors may include accelerometers, magnetometers, gyroscopic sensors (e.g., micro-electro-mechanical system (MEMS) gyros), and/or other sensors for utilization in determining the orientation of the tool string 110 relative to the wellbore 120.

One or more of the downhole modules, sensors, and/or tools 112 may also or instead be or comprise one or more sensors operable for determining petrophysical and/or geophysical parameters of a portion of the formation 130 along the wellbore 120. For example, the sensors may be configured to measure or detect one or more of pressure, temperature, strain, seismic activity, and acoustic or vibration waves along the wellbore 124 and coiled tubing 162, as well as composition, electric resistivity, dielectric constant, magnetic resonance relaxation time, and nuclear radiation. Other examples may include fluid sensors through which obtained fluid samples may flow, such as to measure properties and/or composition data of the sampled fluid. For example, the fluid sensors may comprise one or more of a spectrometer, a fluorescence sensor, an optical fluid analyzer, a density sensor, a viscosity sensor, a pressure sensor, and a temperature sensor. However, other sensors are also within the scope of the present disclosure.

The wellsite system 100 may also include a telemetry system comprising one or more telemetry tools implemented as one or more of the downhole modules, sensors, and/or tools 112 and/or a portion of the control center 180 to facilitate communication between the tool string 110 and the control center 180. The telemetry system may be or comprise one or more of a mud-pulse telemetry system, an acoustic telemetry system, a wired electrical telemetry system, an electromagnetic telemetry system, and/or an optical telemetry system, among other examples.

During downhole operations, outputs from or information generated by the various downhole tools 112 may be received, processed, and/or sent via the conduits 184, 186 to the control center 180 by a downhole electronics and processing (DEP) system 114 of the tool string 110. The DEP system 114 may further store the information in various numbers and/or types of memory for subsequent recall and/or processing after the tool string 110 is retrieved to the surface 105. Although FIG. 1 shows a single DEP system 114 within the tool string 110 for communication with the downhole modules, sensors, and/or tools 112, each downhole module, sensor, and/or tool 112 may comprise a distinct DEP system 114, which may be independently operable to receive, process, and/or send information to the control center 180 via the conduits 184, 186.

Figure 2:
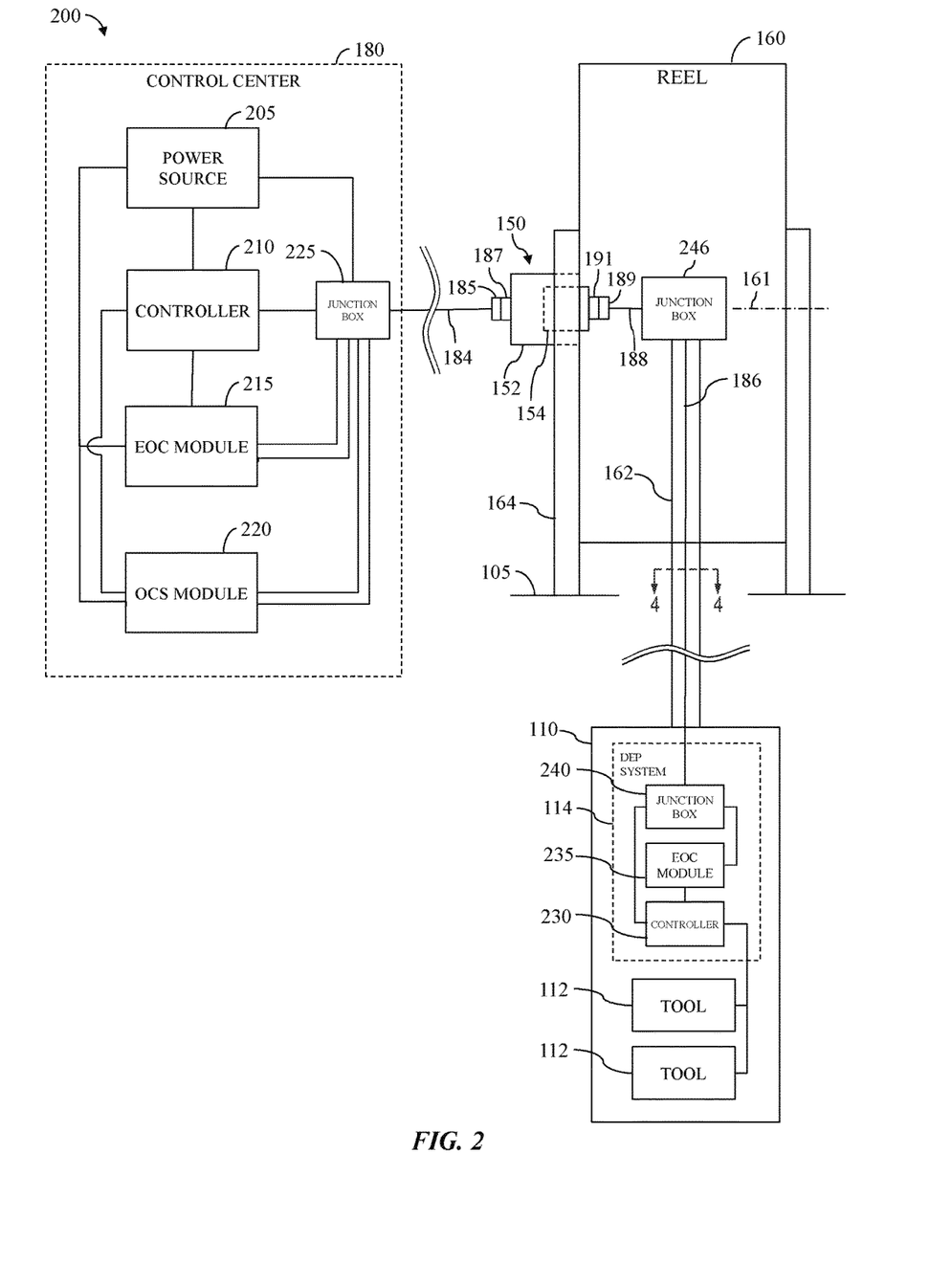
FIG. 2 is a schematic view of an example implementation of a portion of the apparatus shown in FIG. 1 according to one or more aspects of the present disclosure.

FIG. 2 is a schematic view of an example implementation of at least a portion of a power and communication system 200 that may be implemented in the environment of the wellsite system 100 shown in FIG. 1 according to one or more aspects of the present disclosure. Thus, the following description refers to FIGS. 1 and 2, collectively.

The power and communication system 200 comprises at least a portion of the control center 180, and is in communication with the DEP system 114 of the tool string 110 via the conduits 184, 186 and the rotary joint 150. The power and communication system 200 may comprise an optical telemetry system operable to transmit optical signals between the DEP system 114 of the tool string 110 and the control center 180 via optical conductors of the conduits 184, 186 and optical channels or passes (hereinafter referred to as "optical pathways") of the rotary joint 150. The power and communication system 200 may further comprise an electrical telemetry system operable to transmit electrical signals between the DEP system 114 of the tool string 110 and the control center 180 via electrical conductors of the conduits 184, 186 and electrical channels or passes (hereinafter referred to as "electrical pathways") of the rotary joint 150. The power and communication system 200 may also comprise an electrical power system operable to transmit electrical power from the control center 180 to the DEP system 114 or other portion of the tool string 110 via electrical conductors of the conduits 184, 186 and electrical pathways of the rotary joint 150.

Figure 3:
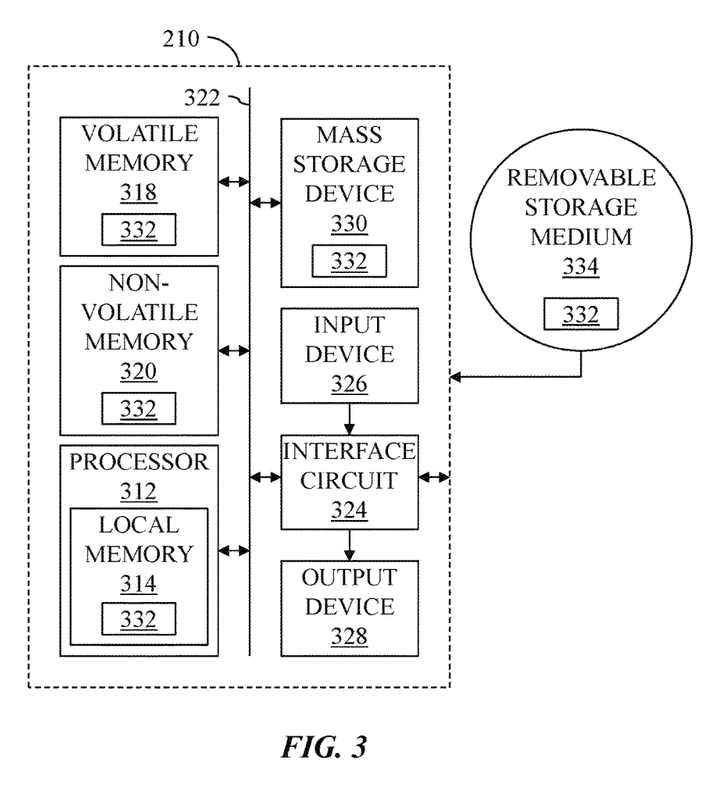
FIG. 3 is a schematic view of an example implementation of a portion of the apparatus shown in FIG. 2 according to one or more aspects of the present disclosure.

The control center 180 comprises a controller 210, such as may be implemented as described below with reference to FIG. 3. The control center 180 may also comprise one or more of a power source 205, an electrical/optical conversion (EOC) module 215, an optical conductor sensor (OCS) module 220, and one or more junction boxes 225. When included in the control center 180, such components may be in direct or indirect communication with the controller 210. The EOC module 215 is operable to convert optical signals to electrical signals and electrical signals to optical signals. The OCS module 220 is operable in conjunction with one or more optical conductors of at least a portion of the conduit 186 (e.g., as sensors) for determining certain parameters associated with the wellbore 120 along the length of at least a portion of the conduit 186. The power source 205 supplies electrical power to various components or portions of the control center 180, and perhaps to various components of the tool string 110 via electrical conductors of the conduits 184, 186. The one or more junction boxes 225 house electrical and/or optical connections between the conduit 184 and the various components of the control center 180.

The power source 205 may be operable to receive electrical power at an input voltage and output electrical power at one or more selected voltages that differ relative to the input voltage. For example, the power source 205 may receive electrical power ranging between about 85 volts AC (alternating current) and about 265 volts AC, and may output electrical power at one or more selected voltages ranging between zero volts DC (direct current) and about 1500 volts DC, although other (including higher) input and/or output (including AC) voltages are also within the scope of the present disclosure. The power source 205 may comprise a plurality of output channels, some of which may supply power at low voltages to components operating at low voltages, while other output channels may supply power at high voltages to components operating at high voltages. The high voltage power may be supplied to a downhole power module (such as the downhole power module 245 shown in FIGS. 5-8 and described below), which may adjust the voltage and/or distribute the electrical power to the modules, sensors, and/or tools 112 and/or other components of the tool string 110.

The controller 210 may be in optical communication with the DEP system 114 of the tool string 110 via the optical conductors and pathways of the conduits 184, 186 and the rotary joint 150 by utilizing the EOC module 215. The controller 210 may be in electrical communication with the DEP system 114 via the electrical conductors and pathways of the conduits 184, 186 and the rotary joint 150 without utilizing the EOC module 215.

The controller 210 is operable to execute machine-readable instructions to implement at least a portion of one or more apparatus, systems, methods, and/or processes within the scope of the present disclosure. FIG. 3 is a schematic view of a portion of an example implementation of the controller 210 according to one or more aspects of the present disclosure. The following description refers to FIGS. 1-3, collectively.

The controller 210 may be, comprise, or form a portion of one or more general- or special-purpose processors, computing devices, servers, computers, personal digital assistant (PDA) devices, smartphones, Internet appliances, and/or other types of computing devices. In the example implementation depicted in FIG. 3, the controller 210 comprises a processor 312 that includes a local memory 314. The processor 312 executes coded instructions 332 present in the local memory 314 and/or another memory device. The coded instructions 332 may comprise, among other things, machine-readable instructions or programs to implement the apparatus, systems, methods, and/or processes within the scope of the present disclosure. For example, the coded instructions 332 stored in the local memory 314 may include program instructions or computer program code that, when executed by the processor 312, cause the power source 205, the EOC module 215, the OCS module 220, the DEP system 114, one or more of the downhole tools 112, and/or other components of the tool string 110 to perform at least a portion of a method and/or process described herein. The processor 312 may be, comprise, or be implemented by one or a plurality of processors of various types suitable to the local application environment, and may include one or more general- or specific-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 312 may be in communication with a main memory, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory (ROM), flash memory, and/or other types of memory devices. One or more memory controllers (not shown) may control access to the volatile memory 318 and/or non-volatile memory 320. The controller 210 may be operable to store or record the signals or information received from the DEP system 114, the EOC module 215, and the OCS module 220 on the main memory.

The controller 210 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, and/or a cellular interface, among others. The interface circuit 324 may also comprise a graphics driver card. The interface circuit 324 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 326 may also be connected to the interface circuit 324. The input devices 326 may permit a human operator to enter data and/or commands into the controller 210. Each input device 326 may be, comprise, or be implemented by a keyboard, a mouse, a touchscreen, a track-pad, a trackball, an isopoint, and/or a voice recognition system, among other examples. One or more output devices 328 may also be connected to the interface circuit 324. Each output device 328 may be, comprise, or be implemented by a display device (e.g., a liquid crystal display (LCD) or cathode ray tube display (CRT), among others), a printer, and/or a speaker, among other examples.

The controller 210 may also comprise one or more mass storage devices 330 for storing machine-readable instructions and data. Examples of such mass storage devices 330 include floppy disk drives, hard drive disks, compact disk (CD) drives, and digital versatile disk (DVD) drives, among others. The coded instructions 332 may be stored in the mass storage device 330, the volatile memory 318, the non-volatile memory 320, the local memory 314, and/or on a removable storage medium 334, such as a CD or DVD. Thus, the controller 210 may be implemented in accordance with hardware (embodied in one or more chips including an integrated circuit, such as an ASIC), or may be implemented as software or firmware for execution by the processor 312. In the case of firmware or software, the implementation may be provided as a computer program product including a computer readable medium or storage structure embodying computer program code (i.e., software or firmware) thereon for execution by the processor 312.

The coded instructions 332 may include program instructions or computer program code that, when executed by the processor 312, cause the controller 210 to perform methods and processes as described herein. For example, the coded instructions 332, when executed, may cause the controller 210 to communicate information between the control center 180 and the tool string 110 via the electrical and/or optical conductors and pathways of the conduits 184, 186 and the rotary joint 150 while the reel 160 of coiled tubing 162 is rotating. The coded instructions 332, when executed, may cause the controller 210 to receive, process, and/or record the signals or information generated by and/or received from the DEP system 114, the EOC module 215, the OCS module 220, and/or other information sources. The coded instructions 332, when executed, may also cause the controller 210 to communicate electrical signals with the DEP system 114 via the electrical conductors of the conduits 184, 186 and the electrical pathways of the rotary joint 150, and/or communicate optical signals with the DEP system 114 via the EOC module 215, the optical conductors of the conduits 184, 186, and the optical pathways of the rotary joint 150. The controller 210 may be further operable to cause the OCS module 220 to transmit optical signals through one or more optical conductors of the conduits 184, 186 and one or more optical pathways of the rotary joint 150, as well as to receive the optical signals reflected back along the same or different optical conductors and pathways, as further described below.

The EOC module 215 may comprise a communications board or another electrical-to-optical and optical-to-electrical transducer that is in electrical communication with the controller 210 and in optical communication with the tool string 110 via the conduits 184, 186 and the rotary joint 150. The EOC module 215 may facilitate optical communication between the controller 210 and the DEP system 114 via the optical conductors and pathways of the conduits 184, 186 and the rotary joint 150.

The OCS module 220 is operable for the measurement of various physical parameters associated with the wellbore 120, the fluid medium surrounding at least a portion of the conduit 186 carried with the coiled tubing 162 (whether within or outside the coiled tubing 162), and/or the formation 130, such as by utilizing at least a portion of one or more of the optical conductors of the conduit 186 as linear sensors. For example, the OCS module 220 may be utilized to perform a distributed temperature survey (DTS), which may be known in the art as distributed temperature sensing, to measure the temperature of the medium surrounding the linear sensor portion of the optical conductor(s) of the conduit 186. The OCS module 220 may be further utilized to perform a distributed vibration survey (DVS), which may be known in the art as distributed acoustic sensing, to measure acoustic, vibration, and/or seismic waves along the coiled tubing 162 and/or within the medium surrounding the linear sensor portion of the optical conductor(s) of the conduit 186. The OCS module 220 may also be utilized to perform a distributed pressure survey (DPS), which may be known in the art as distributed pressure sensing, to measure strain (e.g., radial strain) sustained by the optical conductor(s) caused by the medium surrounding the linear sensor portion of the optical conductor(s) of the conduit 186, which may be indicative of pressure along the wellbore 120 and/or within the coiled tubing 162. The OCS module 220 may also be utilized to perform a distributed strain survey (DSS), which may be known in the art as distributed strain measurement, to measure strain (e.g., axial strain) sustained by the optical conductor(s), which may be indicative of tension or compression sustained by the coiled tubing 162, such as may be caused by fluid flow through the coiled tubing 162 or by movement of the coiled tubing 162 during deployment or other downhole operations.

The OCS module 220 may comprise a laser or light source (not shown) in optical communication with one or more optical conductors of the conduits 184, 186 and one or more optical pathways of the rotary joint 150, such as may be operable to emit optical signals into the optical conductor(s) of the conduit 184. The optical signals may travel along one or more first optical conductors of the conduits 184, 186, including through one or more first optical pathways of the rotary joint 150, and after reflection return to the OCS module 220 through one or more second optical conductors of the conduits 184, 186 that are different from the one or more first optical conductors, including through one or more second optical pathways of the rotary joint 150 that are different from the one or more first optical pathways. However, the optical signals may also or instead travel from and return to the OCS module 220 through the same optical conductor(s) and/or the same optical pathway(s).

The DTS, DVS, DPS, and/or DSS operations described above rely on the fact that, as the optical signals travel through the optical conductor(s) of the conduit 186, the optical signals are reflected along the boundary between a core of the optical conductor(s) and the surrounding cladding. At least a portion of the optical signals may be scattered in varying degrees based on physical changes in the optical conductor(s), such as may be proportional to and/or otherwise caused by corresponding changes in the medium surrounding the optical conductor(s) and/or vibrations affecting the optical conductor(s). The scattered portion of the optical signals are reflected and transmitted back through the optical conductors of the conduits 184, 186 and the optical pathway(s) of the rotary joint 150 toward OCS module 220. A directional coupler or an optical splitter (not shown) may separate the optical signals emitted by the light source from the reflected portion of the optical signals and then send the reflected optical signals to a signal processing unit of the OCS module 220 (not shown), wherein the reflected optical signals are processed and analyzed to determine temperature, vibration, and/or other parameters along the linear sensor portion of the optical conductor(s) of the conduit 186. Moreover, because the optical signals are sent and received through the rotary joint 150, the OCS module 220 may be utilized to measure such parameters along the conduit 186 while the reel 160 of coiled tubing 162 is rotating, instead of just during those periods in which the reel 160 is not rotating.

Connections between the conduit 184 and the power source 205, the controller 210, the EOC module 215, and the OCS module 220 may be housed within the junction box 225, which may be operable to house and/or isolate such connections from the surrounding environment. For example, the electric conductors from the power source 205 and the controller 210 may be spliced or otherwise connected with corresponding electrical conductors of the conduit 184 within the junction box 225. The optical conductors from the EOC module 215 and the OCS module 220 may be connected with corresponding optical conductors of the conduit 184 via optical connectors, such as LC, ST, and/or other industry standard connectors.

FIG. 2 also depicts an example implementation of the DEP system 114 according to one or more aspects of the present disclosure. For example, the DEP system 114 may comprise a downhole controller 230 that may be operable to receive commands and/or other information from the control center 180, process such commands, and cause the modules, sensors, and/or tools 112 and/or other components of the tool string 110 to operate according to the commands. The downhole controller 230, other components of the DEP system 114, or the entirety of the DEP system 114 may be implemented by a processing system having one or more components that are functionally and/or structurally similar to one or more of the components of the controller 210 shown in FIG. 3.

The downhole controller 230 may be further operable to receive information from one or more of the modules, sensors, and/or tools 112 of the tool string 110, process the information, store the information, and/or transmit the raw and/or processed information to the control center 180 via the conduits 184, 186 and the rotary joint 150. The downhole controller 230 may also communicate with the control center 180 via electrical signals transmitted via the electrical conductors of the conduits 184, 186 and the electrical pathways of the rotary joint 150. The downhole controller 230 may also or instead communicate with the control center 180 via optical signals transmitted via the optical conductors of the conduits 184, 186 and the optical pathways of the rotary joint 150, such as via utilization of a downhole EOC module 235 of the DEP system 114. The downhole EOC module 235 may be in optical communication with the control center 180 and electrical communication with the downhole controller 230.

Connections between the conduit 186 and the EOC module 235 and/or the downhole controller 230 may be housed within a downhole junction box 240, such as may be operable to house and/or isolate such connections from the harsh and/or hazardous downhole environment. One or more aspects of the downhole junction box 240 may be substantially similar to those of the junction box 225. For example, electrical conductors of the conduit 186 may be spliced or otherwise connected with corresponding electrical conductors extending to the downhole controller 230 within the downhole junction box 240, and optical conductors of the conduit 186 may be connected with corresponding optical conductors extending to the downhole EOC module 235 within the downhole junction box 240. The downhole junction box 240 may be an explosion proof junction box or otherwise rated for hazardous environments, such that the downhole junction box 240 may encapsulate the electrical connections to prevent or minimize the occurrence of electrical arcs and/or otherwise prevent or minimize electrical initiation of explosions.

Although FIGS. 1 and 2 show a downhole tool string 110 comprising the DEP system 114 and one or more of the downhole modules, sensors, and/or tools 112, the power and communication system 200 may be implemented without including the downhole tool string 110 described above. For example, the power and communication system 200 may be utilized to perform the DTS, DVS, DPS, and/or DSS operations without performing measurement or other operations associated with the one or more tools 112, the downhole EOC module 235, and the downhole controller 230. In such implementations, the coiled tubing 162 containing the conduit 186 may be deployed within the wellbore 130 to perform the DTS, DVS, DPS, and/or DSS operations as described above without including the downhole tool string 110. Also, one or more of the electrical conductors of the conduit 186 may be utilized to heat the conduit 186. Accordingly, a downhole end of the coiled tubing 162 may be terminated with an end member (not shown), which may be operable to plug the downhole end of the coiled tubing 162, secure the conduit 186 to the coiled tubing 162, connect together two or more electrical conductors, and/or connect together two or more optical conductors for performing double-ended DTS operations, as described below.

As further depicted in FIG. 2, the power and communication system 200 may also comprise a reel junction box 246 disposed within the reel 160. The reel junction box 246 may house the electrical and/or optical connections between the conduit 186 and another conduit 188 connected with the rotary joint 150. The reel junction box 246 may also house additional electronic and/or monitoring equipment, such as one or more of the controllers 210, 230 and the EOC modules 215, 235, or the reel junction box 246 may also house an additional controller and/or EOC module (not shown). The additional electronic and/or monitoring equipment housed within the reel junction box 246 may be powered by the power source 205. The reel junction box 246 has one or more aspects that are functionally and/or structurally similar to those of the junction box 225 and/or the downhole junction box 240, and may be rated for hazardous environments.

The conduit 188 located within the reel 160 is optically and/or electrically connected with the conduit 184 via the rotary joint 150. That is, because the conduit 184 may be substantially stationary while the conduit 188 may be rotating with the reel 160, the rotary joint 150 may be utilized to connect the corresponding electrical and/or optical conductors of the two conduits 184, 188.

The rotary joint 150 may comprise a stationary portion 152 and a rotatable portion 154. For example, the stationary portion 152 may substantially be or be formed by a housing or other outer portion of the rotary joint 150, and the rotatable portion 154 may substantially be or be formed by an inner portion of the rotary joint 150. The rotary joint 150 may be disposed on the outside of the reel 160, the inside of the reel 160, or both, along an axis of rotation 161 of the reel 160. The stationary portion 152 is directly or indirectly fixedly coupled to the stationary base 164 or a stationary member associated with the reel 160. The rotatable portion 154 is connected with a rotating member and/or other rotating portion of the reel 160.

The conduit 184 may terminate at the end proximate the rotary joint 150 with a mechanical connector 185, comprising both electrical and optical leads, for mating with a corresponding connector and/or other mechanical, electrical, and optical interface 187 of the stationary portion 152 of the rotary joint 150. Similarly, the conduit 188 may terminate at the end proximate the rotary joint 150 with a mechanical connector 189, comprising both electrical and optical leads, for mating with a corresponding connector and/or other mechanical, electrical, and optical interface 191 of the rotating portion 154 of the rotary joint 150. The connectors 185, 189 and/or interfaces 187, 191 may include push and twist connectors, threaded connectors, and/or other types of connectors and/or interfaces, including those which may aid in aligning the corresponding electrical and optical leads, sealing the connected leads, and/or establishing an affirmative physical connection.

Figure 4:
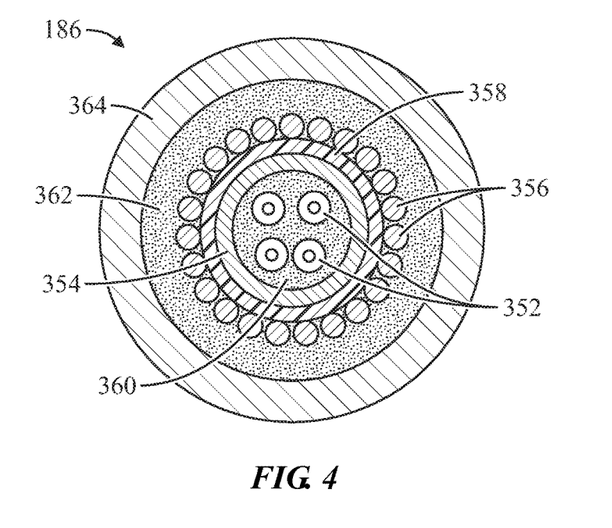
FIG. 4 is a sectional view of an example implementation of a portion of the apparatus taken along line 4-4 in FIG. 2 according to one or more aspects of the present disclosure.

FIG. 4 is a sectional view of an example implementation of at least a portion of the conduit 186 according to one or more aspects of the present disclosure. The conduit 186 may comprise four optical fibers or conductors 352 disposed within a welded metal (e.g., steel) tube 354 and surrounded by a plurality of copper conductors 356 helically arranged about the metal tube 354. A layer of soft polymer 358 may be disposed between the metal tube 354 and the copper conductors 356 to insulate the metal tube 354 from the copper conductors 356 and/or to support the copper conductors 356 about the metal tube 354. Insulating material layers 360, 362, such as may be or comprise a polymer and/or polymeric material, glass yarn and/or fibers, may be disposed about the optical conductors 352 and/or the copper conductors 356 for additional protection and/or electrical insulation. The outer portion of the conduit 186 may comprise an outer wall or layer 364 of cladded Inconel® or other material. The electrical power may be conducted to the tool string 112 via the metal tube 354 and/or the copper conductors 356, while the outer layer 364 (and/or the coiled tubing 162) may provide the electrical return path.

Figure 5:
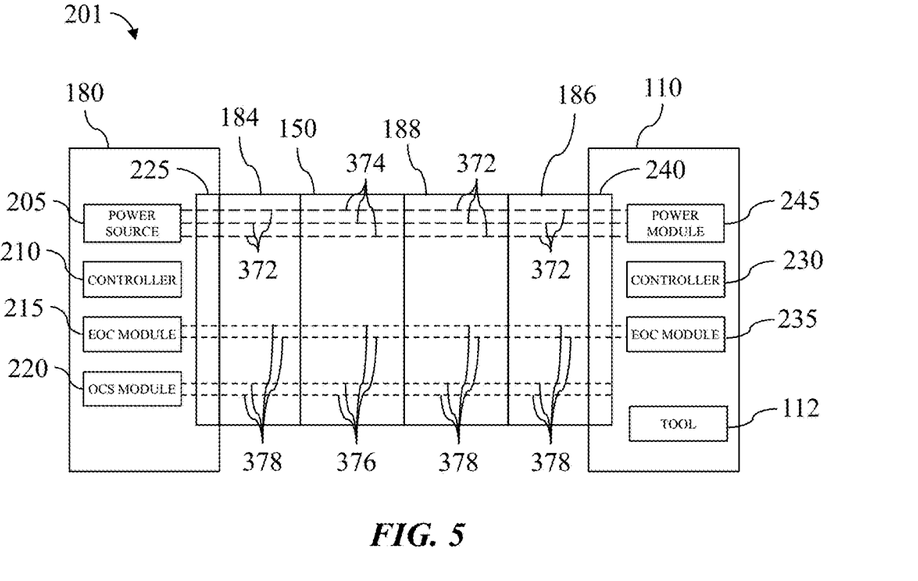
FIG. 5 is a schematic view of an example implementation of a portion of the apparatus shown in FIG. 2 according to one or more aspects of the present disclosure.

As described above, the rotary joint 150 comprises electrical and optical pathways that connect corresponding electrical and optical conductors of the conduits 184, 188, such that optical signals, electrical signals, and/or electrical power may be communicated between the control center 180 and the tool string 110 via the conduits 184, 186, 188, including while the reel 160 and the conduit 188 are rotating. For example, FIG. 5 is a schematic view of a portion of an example implementation of the power and communication system 200 shown in FIG. 2, designated in FIG. 5 by reference numeral 201, depicting an example of how the conduits 184, 186, 188 and the rotary joint 150 may establish electrical and optical connections between the control center 180 and the tool string 110. It is noted that while some components of the control center 180, the conduits 184, 186, 188, the rotary joint 150, and the tool string 110 depicted in one or more of FIGS. 1-4 are missing in the example implementation depicted in FIG. 5, it is to be understood that their removal from FIG. 5 is merely for the sake of simplicity and clarity, and that the components not shown in FIG. 5 are understood to exist as described above with respect to one or more of FIGS. 1-4.

In the example implementation of FIG. 5, the conduits 184, 186, 188 each comprise three electrical conductors 372 connected together by three corresponding electrical pathways 374 of the rotary joint 150 to establish electrical connection between the power source 205 of the control center 180 and a power module 245 of the tool string 110. The electrical conductors 372 and the electrical pathways 374 may comprise a low voltage pathway, a high voltage pathway, and a return pathway or ground. Furthermore, three electrical conductors 372 and pathways 374 extending between the power source 205 and the downhole power module 245 may also be utilized to send three-phase AC power to the downhole tool string 110.

The power module 245 may be a component of the DEP system 114, one or more of the modules and/or tools 112, and/or another component of the tool string 110. The power module 245 is operable to distribute electrical power to the DEP system 114, one or more of the modules, sensors, and/or tools 112 of the tool string 110, and/or other components of the tool string 110.

The conduits 184, 186, 188 each also comprise four optical conductors 378 connected together by four corresponding optical pathways 376 of the rotary joint 150. Two of the optical conductors 378 of each of the conduits 184, 186, 188 and two corresponding pathways 376 of the rotary joint 150 may establish optical connections between the surface EOC module 215 of the control center 180 and the downhole EOC module 235. For example, such arrangement may facilitate optical telemetry whereby signals from the surface EOC module 215 may be transmitted to the downhole EOC module 235 (i.e., downlink) via one of the optical conductors 378 and one of the pathways 376, while signals from the downhole EOC module 235 may be transmitted to the surface EOC module 215 (i.e., uplink) via the other optical conductor 378 and pathway 376. The remaining two optical conductors 378 and pathways 376 may establish optical connections for performing the DTS, DVS, DPS, and/or DSS operations described above.

Although the example implementation of the rotary joint 150 shown in FIG. 5 comprises three electrical pathways 374 and four optical pathways 376, other rotary joints comprising other quantities of electrical and/or optical pathways 374, 376 may also be utilized within the scope of the present disclosure, such as may depend on the application or project demands. For example, the rotary joint 150 may comprise between two and ten electrical pathways 374, and between one and five optical pathways 376. Multi-pathway hybrid electrical and optical rotary joints for are commercially available through manufacturers, such as Trolex Engineering of Hazel Grove, Stockport, United Kingdom, and Moog Inc. of Dartmouth, Nova Scotia, Canada. For example, a rotary joint 180X/215, manufactured by Moog Inc., has eight electrical pathways and two optical pathways.

Figure 6:
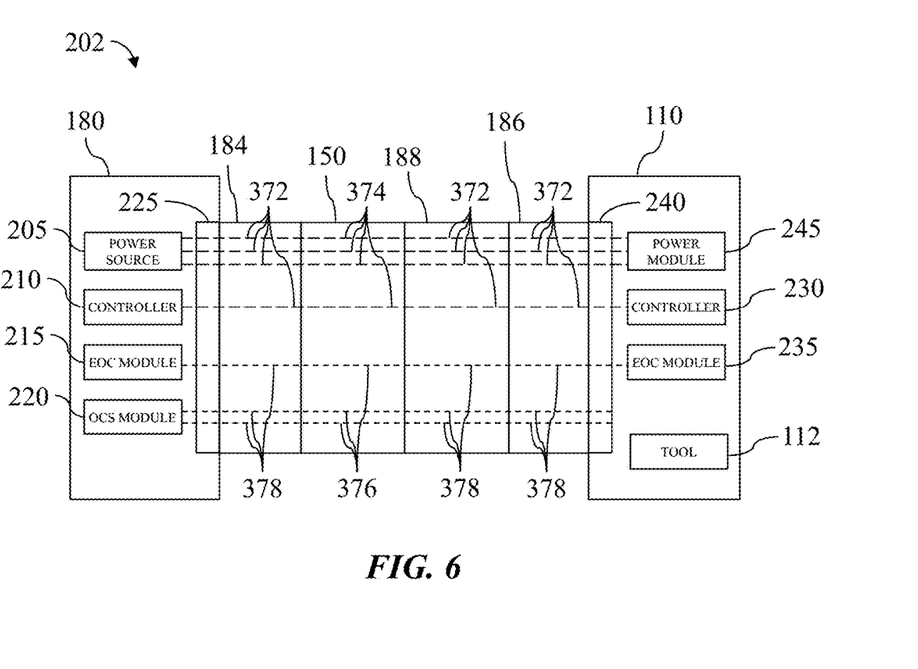
FIG. 6 is a schematic view of an example implementation of a portion of the apparatus shown in FIG. 2 according to one or more aspects of the present disclosure.

FIG. 6 is a schematic view of another example implementation of the power and communication system 201 shown in FIG. 5, designated in FIG. 6 by reference numeral 202. The power and communication system 202 shown in FIG. 6 is substantially similar to the power and communication system 201 shown in FIG. 5, except as described below.

For example, the conduits 184, 186, 188 of the power and communication system 202 each comprise four electrical conductors 372 connected together by four corresponding electrical pathways 374 of the rotary joint 150 to establish an electrical connection between the power source 205 of the control center 180 and the downhole power module 245 and between the surface controller 210 and the downhole controller 230. The conduits 184, 186, 188 of the power and communication system 202 also comprise three optical conductors 378 connected together by three corresponding optical pathways 376 of the rotary joint 150. One of the optical conductors 378 and pathways 376 may establish an optical connection between the surface EOC module 215 and the downhole EOC module 235. For example, such arrangement may facilitate optical/electrical telemetry whereby uplink transmission may be via the optical conductor 378 and pathway 376 extending between the EOC modules 215, 235, while downlink transmission may be via the electrical conductor 374 and pathway 372 extending between the controllers 210, 230. The remaining two optical conductors 378 and pathways 376 may establish optical connections for performing the DTS, DVS, DPS, and/or DSS operations described above.

Although FIG. 6 depict the controllers 210, 230 in electrical communication via a fourth electrical conductor 372 and pathway 374, such as to establish the electrical uplink between the controllers 210, 230, the electrical uplink and/or an electrical downlink may be established via one or more of the electrical conductors 372 and pathways 374 extending between the power source 205 and the power module 245. Accordingly, the electrical telemetry and electrical power transmission may be facilitated over the same electrical conductors 372 of the conduits 184, 186, 188 and the electrical pathways 374 of the rotary joint 150.

Figure 7:
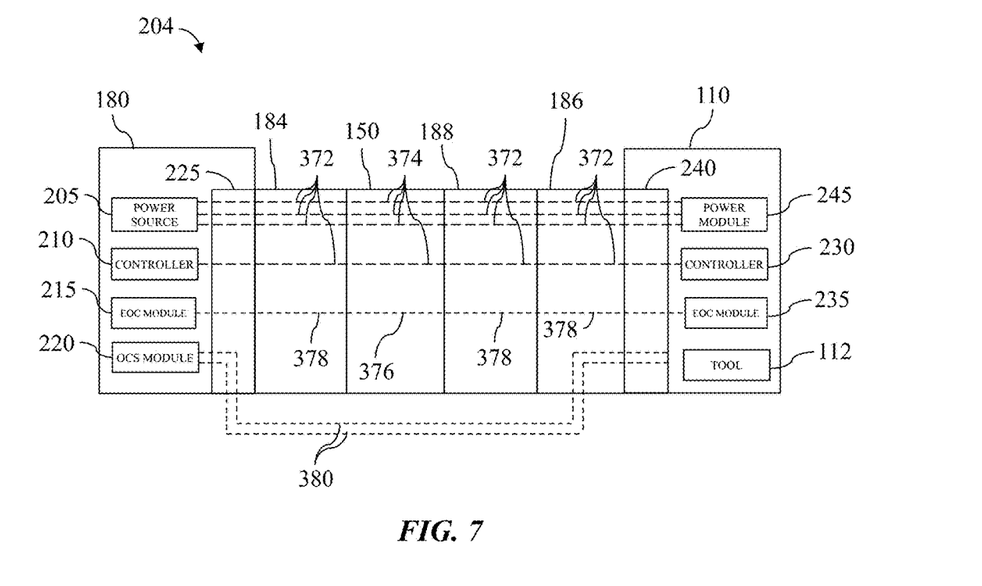
FIG. 7 is a schematic view of an example implementation of a portion of the apparatus shown in FIG. 2 according to one or more aspects of the present disclosure.

FIG. 7 is a schematic view of another example implementation of the power and communication system 201 shown in FIG. 5, designated in FIG. 7 by reference numeral 204. The power and communication system 204 shown in FIG. 7 is substantially similar to the power and communication system 201 shown in FIG. 5, except as described below.

For example, the conduits 184, 186, 188 of the power and communication system 204 comprise four electrical conductors 372 connected together by four corresponding electrical pathways 374 of the rotary joint 150 to establish an electrical connection between the power source 205 of the control center 180 and the downhole power module 245 and between the surface controller 210 and the downhole controller 230. The conduits 184, 186, 188 of the power and communication system 204 also comprise one optical conductor 378, and the rotary joint 150 comprises one optical pathway 376, wherein the optical conductors 378 of the conduits 184, 186, 188 and the optical pathway 376 establish an optical connection between the surface EOC module 215 and the downhole EOC module 235. For example, such arrangement may facilitate electrical telemetry by establishing an electrical uplink via the electrical conductor 372 and pathway 374 extending between the controllers 210, 230, as described above. Optical telemetry may also or instead be established through the optical conductors 378 of the conduits 184, 186, 188 and the optical pathway 376 extending between the EOC modules 215, 235, as described above.

Because the rotary joint 150 shown in FIG. 7 comprises a single optical pathway 376, the optical connections for performing the DTS, DVS, DPS, and/or DSS operations described above may not be through the rotary joint 150. Instead, such optical connections may be via one or more additional optical conductors 380 extending from the OCS module 220 (perhaps through the junction box 225) and connected with one or more optical conductors within the conduit 186 (disposed within the coiled tubing 162), thus bypassing the conduit 188, the rotary joint 150, and the reel 160. The conduit 188 may collectively carry the optical conductors 380 and the optical conductor 378 for connection with the tool string 110, such as via the junction box 240.

Although FIGS. 5-7 depict the conduits 184, 186, 188 and the rotary joint 150 as comprising three electrical conductors 372 and pathways 374 extending between the power source 205 and the downhole power module 245, other implementations within the scope of the present disclosure may include one or two electrical conductors 372 and pathways 374 extending between the power source 205 and the downhole power module 245, such as may reduce the number of electrical pathways 374 included within the rotary joint 150. For example, when utilizing two electrical conductors 372 and pathways 374 extending between the power source 205 and the downhole power module 245, one of the electrical conductors 372 and pathways 374 may be utilized to send high voltage electric power to the downhole tool string 110, while the other of the electrical conductors 372 and pathways 374 may be utilized as an electrical return path from the downhole tool string 110. Furthermore, two electrical conductors 372 and pathways 374 extending between the power source 205 and the downhole power module 245 may also be utilized to send single phase AC current to the downhole tool string 110. Also, while each of the conduits 184, 188 and the rotary joint 150 may comprise two electrical conductors 372 and pathways 374 designated as part of the electrical power supply and return paths, the conduit 186 may comprise one electrical conductor 372 designated to supply high voltage electrical power to the power module 245 of the downhole tool string 110, while the coiled tubing 162 may be utilized as part of the electrical power return path, conducting the returning electrical current from the power module 245 of the tool string 110 to the surface 105. In such implementations, the coiled tubing 162 may be electrically connected with the electrical conductor 372 of the conduit 188 to convey the returning electrical current back to the power source 205 via the rotary joint 150 and the conduits 184, 188.

Also, although FIGS. 5-7 depict the OCS module 220 as utilizing two optical conductors 378, 380 and pathways 376, other implementations of the OCS module 220 within the scope of the present disclosure may utilize a single optical conductor 378, 380 and pathway 376. For example, for performing single-ended DTS, DVS, DPS, or DSS operations, the OCS module 220 may utilize one optical conductor 378 in optical communication via one optical pathway 376. However, for performing double-ended DTS operations, the OCS module 220 may utilize two optical conductors 378 in optical communication via two optical pathways 376, as shown in FIGS. 5 and 6. Furthermore, although FIGS. 5-7 depict one OCS module 220, which may be utilized for performing one or more of the DTS, DVS, and DPS operations, the control center 180 and/or another portion of the wellsite system 100 may comprise two or more OCS modules 220, each operable for performing a different one of the DTS, DVS, and DPS operations.

Figure 8:
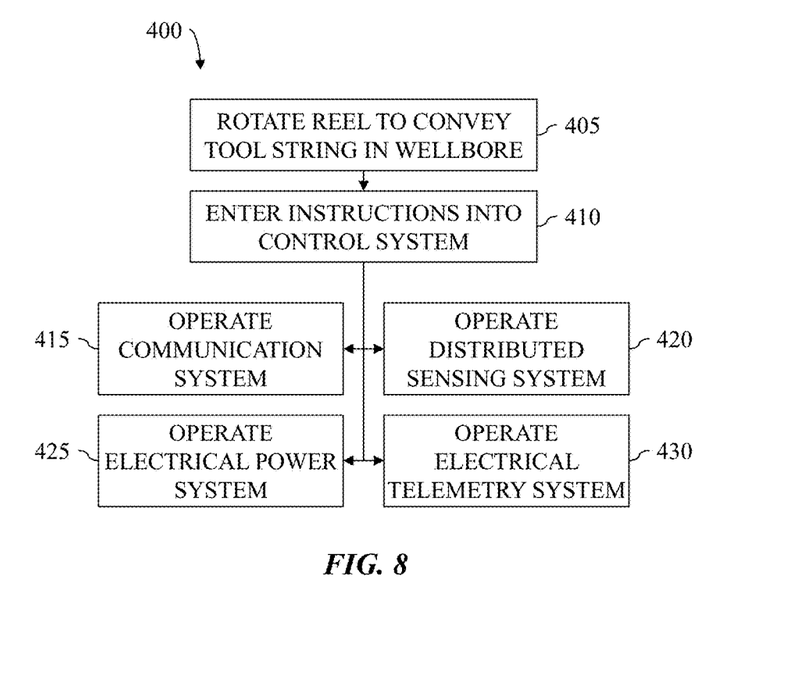
FIG. 8 is a flow-chart diagram of at least a portion of a method according to one or more aspects of the present disclosure.

FIG. 8 is a flow-chart diagram of at least a portion of a method (400) according to one or more aspects of the present disclosure. The method (400) may be performed utilizing at least a portion of one or more implementations of the apparatus shown in one or more of FIGS. 1-7 and/or otherwise within the scope of the present disclosure. The following description refers to FIGS. 1-8, collectively.

The method (400) comprises rotating (405) the reel 160 of coiled tubing 162 to convey the downhole tool string 110 into the wellbore 120. Instructions are then entered (410) into the control system 180 disposed at the wellsite surface 105 from which the wellbore 120 extends. A communication system is then operated (415) to transmit optical signals between the control system 180 and the downhole tool string 110 via the rotary joint 150 and a plurality of optical conductors 378, wherein the rotary joint 150 is disposed in association with the reel 160 and in optical communication with the plurality of optical conductors 378, as described above. The communication system may be or have one or more aspects of one or more of the power and communication systems 200-204 depicted in FIGS. 2 and 5-7 and/or otherwise within the scope of the present disclosure.

As described above, the rotary joint 150 may comprise a rotary portion 154 and a stationary portion 152. The rotatable portion 154 may be in optical communication with a first one of the plurality of optical conductors 378, such as of the conduit 184. The stationary portion 152 may be in optical communication with the rotatable portion 154, such as via an optical pathway 376, and with a second one of the plurality of optical conductors 378, such as of the conduits 188 and/or 186. Operating (415) the communication system may comprise converting, at the control system 180, the optical signals received from the first one of the optical conductors 378 to electrical signals. Operating (415) the communication system may also or instead comprise converting, at the downhole tool string 110, the optical signals received from the second one of the optical conductors 378 to electrical signals.

As described above, the rotary joint 150 may comprise a single optical pathway 376, such as in the example implementation depicted in FIG. 7. However, the rotary joint 150 may comprise a plurality of optical pathways 376, such as in the example implementations depicted in FIGS. 5 and 6. In such implementations, among others within the scope of the present disclosure, operating (415) the communication system may comprise operating the communication system to transmit a first optical signal through a first one of the plurality of optical pathways 376 in a first direction, and operating the communication system to transmit a second optical signal through a second one of the plurality of optical pathways 376 in a second direction.

The method (400) may further comprise operating (420) a distributed sensing system, such as for the DTS, DVS, DPS, and/or DSS operations described above. For example, operating (420) the distributed sensing system may include communicating light pulses emitted by a light source disposed at the wellsite surface 105 into an optical conductor 378 of the conduit 184, through an optical pathway 376 of the rotary joint 150 and an optical conductor 378 of the conduit 188, and into an optical conductor 378 of the conduit 186 disposed within the coiled tubing 162 within the wellbore 120; receiving at a signal processing unit disposed at the wellsite surface 105 (e.g., the OCS module 220 of the control system 180) the light pulses reflected out of the optical conductor 378 of the conduit 186 via the optical conductor 378 of the conduit 188, the optical pathway 376 of the rotary joint 150, and the optical conductor 378 of the conduit 184; and processing the received light pulses with the signal processing unit to determine values of a parameter associated with the wellbore 120, a medium surrounding the conduit 184 within the wellbore 120 or within the coiled tubing 162 within the wellbore 120, and/or the formation(s) 130 penetrated by the wellbore 120, wherein the parameters values correspond to distributed locations along the length of the optical conductor 378 of the conduit 186 within the wellbore 120. The parameters may comprise at least one of temperature and/or pressure of the medium, strain experienced by the optical conductor 378 within at least the portion of the conduit 186 extending within the wellbore, seismic activity around the wellbore 120, and/or acoustic and/or vibration waves traveling within the medium or along the coiled tubing 162.

The method (400) may further comprise operating (425) an electrical power system to transmit electrical power from an electrical power source at the wellsite surface 105 to the downhole tool string 110 via one or more electrical pathways 374 of the rotary joint 150 and a plurality of electrical conductors 372 of the conduits 184, 186, 188. For example, the electrical power system may form a portion of the communication system that is operated (415) to transmit optical signals between the control system 180 and the downhole tool string 110, such as may be or have one or more aspects of one or more of the power and communication systems 200-204 depicted in FIGS. 2 and 5-7 and/or otherwise within the scope of the present disclosure. Thus, operating (425) the electrical power system may include conducting electrical power through one or more electrical conductors 372 of the conduit 184, an electrical pathway 374 of the rotary joint 150, one or more electrical conductors 372 of the conduit 188, and one or more electrical conductors 372 of the conduit 186 to the power module 245 and/or other component of the downhole tool string 110.

The method (400) may further comprise operating (430) an electrical telemetry system to transmit electrical signals between the control system 180 and the downhole tool string 110 via one or more electrical pathways 374 of the rotary joint 150 and a plurality of electrical conductors 372 of the conduits 184, 186, 188. For example, the electrical telemetry system may form a portion of the communication system that is operated (415) to transmit optical signals between the control system 180 and the downhole tool string 110, such as may be or have one or more aspects of one or more of the power and communication systems 200-204 depicted in FIGS. 2 and 5-7 and/or otherwise within the scope of the present disclosure. Thus, operating (430) the electrical telemetry system may include conducting electrical signals through one or more electrical conductors 372 of the conduit 184, an electrical pathway 374 of the rotary joint 150, one or more electrical conductors 372 of the conduit 188, and one or more electrical conductors 372 of the conduit 186.

In view of the entirety of the present disclosure, including the figures and the claims, a person having ordinary skill in the art will readily recognize that the present disclosure introduces a system comprising: a reel disposed at a wellsite surface and containing coiled tubing, wherein a first optical conductor is carried with the coiled tubing for conveyance within the wellbore; a control system disposed at the wellsite surface; and a rotary joint disposed in association with the reel and transmitting optical communications, between the control system and a portion the first optical conductor disposed in the wellbore, via at least a second optical conductor extending at least partially between the rotary joint and the control system.

The rotary joint may comprise: a rotatable portion in optical communication with the first optical conductor; and a stationary portion in optical communication with the second optical conductor. In such implementations, among others within the scope of the present disclosure, the system may further comprise a third optical conductor that: is disposed internal to the reel; rotates with the rotatable portion; is optically coupled between the first optical conductor and an optical pathway of the rotatable portion; has a first end mechanically fixedly connected to the rotatable portion; and has a second end mechanically fixedly connected to the first optical conductor. The rotary joint may transmit the optical communications between the control system and a portion the first optical conductor disposed in the wellbore while the reel and the rotatable portion rotate relative to the stationary portion.

The system may further comprise: a light source disposed at the wellsite surface and operable to emit light pulses transmitted into the first optical conductor via at least the rotary joint, wherein a portion of the light pulses transmitted into the first optical conductor become reflected light pulses that are transmitted back along the first optical conductor and through the rotary joint, and wherein the reflected light pulses are indicative of a downhole parameter; and a signal processing unit disposed at the wellsite surface and operable to receive and process the reflected light pulses to determine values of the downhole parameter at locations distributed along the length of the first optical conductor within the wellbore. In such implementations, among others within the scope of the present disclosure, the light source and the signal processing unit may be cooperatively operable to determine the downhole parameter values while the reel rotates relative to the wellsite surface. The downhole parameter may be: temperature of a medium within or outside the coiled tubing within the wellbore; pressure of the medium; acoustic energy traveling within the medium; vibration within the medium; vibration along the coiled tubing; strain within the first optical conductor within the wellbore; and/or seismic activity around the wellbore.

The rotary joint may comprise: a first optical pathway transmitting optical communications transmitted from the control system to the first optical conductor but not optical communications transmitted from the first optical conductor to the control system; and a second optical pathway transmitting optical communications transmitted from the first optical conductor to the control system but not optical communications transmitted from the control system to the first optical conductor.

The system may further comprise a downhole tool connected to the coiled tubing for conveyance within the wellbore via the coiled tubing, wherein the rotary joint may transmit optical communications between the downhole tool and the control system via at least the first and second optical conductors. In such implementations, among others within the scope of the present disclosure, the first optical conductor, the second optical conductor, and the rotary joint may form a portion of an optical telemetry system operable for optical telemetry between the downhole tool and the control system. The control system and the downhole tool may each comprise an optical communication module operable to convert the optical communications into electrical signals and to convert electrical signals into the optical communications.

Such implementations of the system may further comprise: a first electrical conductor disposed with the first optical conductor within the coiled tubing and electrically connected between the downhole tool and an electrical, non-optical pathway of the rotary joint; and a second electrical conductor disposed with the second optical conductor and electrically connected between the control system and the electrical, non-optical pathway of the rotary joint. The first electrical conductor and the first optical conductor may each form portions of a single discrete cable carried with the coiled tubing. The cable may be secured within the coiled tubing or to an external surface of the coiled tubing. The first and second electrical conductors and the electrical, non-optical pathway of the rotary joint may collectively provide an electrical telemetry path between the downhole tool and the control system. The first electrical conductor, the second electrical conductor, and the electrical, non-optical pathway of the rotary joint may collectively form a portion of an electrical telemetry system operable for transmitting electrical communications from the control system to the downhole tool, and the first optical conductor, the second optical conductor, and the rotary joint may collectively form a portion of an optical telemetry system operable for transmitting optical communications from the downhole tool to the control system. The system may further comprise an electrical power source disposed at the wellsite surface, wherein the first and second electrical conductors and the electrical, non-optical pathway of the rotary joint may collectively provide an electrical power transmission path from the electrical power source to the downhole tool.

In implementations in which the system comprises a downhole tool connected to the coiled tubing and the rotary joint transmits optical communications between the downhole tool and the control system via at least the first and second optical conductors, the system may further comprise: a first electrical conductor disposed with the first optical conductor within the coiled tubing and electrically connected between the downhole tool and a first electrical, non-optical pathway of the rotary joint; a second electrical conductor disposed with the first optical conductor within the coiled tubing and electrically connected between the downhole tool and a second electrical, non-optical pathway of the rotary joint; a third electrical conductor disposed with the second optical conductor and electrically connected between the control system and the first electrical, non-optical pathway of the rotary joint; an electrical power source disposed at the wellsite surface; and a fourth electrical conductor disposed with the second optical conductor and electrically connected between the electrical power source and the second electrical, non-optical pathway of the rotary joint. The first and third electrical conductors and the first electrical, non-optical pathway of the rotary joint may collectively provide an electrical telemetry path between the downhole tool and the control system, and the second and fourth electrical conductors and the second electrical, non-optical pathway of the rotary joint may collectively provide an electrical power transmission path from the electrical power source to the downhole tool. The first and second electrical conductors and the first optical conductor may each form portions of a single discrete cable carried with the coiled tubing.

The present disclosure also introduces a system comprising: a reel disposed at a wellsite surface and containing coiled tubing; a downhole tool connected to the coiled tubing for conveyance within the wellbore via the coiled tubing; a control system disposed at the wellsite surface; a rotary joint disposed in association with the reel; at least one first optical conductor disposed within the coiled tubing for communicating optical signals along at least one first optical path extending between the downhole tool and at least one optical pathway of the rotary joint; and at least one second optical conductor for communicating optical signals along at least one second optical path extending between the control system and the at least one optical pathway of the rotary joint.

The rotary joint may comprise: a rotatable portion in optical communication with the at least one first optical conductor; and a stationary portion in optical communication with the at least one second optical conductor.

The rotary joint may transmit the optical communications between the downhole tool and the control system along the at least one first optical path and the at least one second optical path while the reel and the rotatable portion rotate relative to the stationary portion.

The at least one optical pathway of the rotary joint may comprise: a first optical pathway transmitting optical communications transmitted from the control system to the downhole tool but not optical communications transmitted from the downhole tool to the control system; and a second optical pathway transmitting optical communications transmitted from the downhole tool to the control system but not optical communications transmitted from the control system to the downhole tool.

The system may further comprise: a light source disposed at the wellsite surface and operable to emit light pulses transmitted from the at least one second optical path to the at least one first optical path via the at least one optical pathway of the rotary joint, wherein a portion of the light pulses transmitted along the at least one first optical path become reflected light pulses that are transmitted back along the at least one first optical path to the at least one second optical path via the at least one optical pathway of the rotary joint, and wherein the reflected light pulses are indicative of a downhole parameter; and a signal processing unit disposed at the wellsite surface and operable to process the reflected light pulses received from the at least one second optical path to determine values of the downhole parameter at locations distributed along a wellbore portion of the at least one first optical path. The light source and the signal processing unit may be cooperatively operable to determine the downhole parameter values while the reel rotates relative to the wellsite surface. The downhole parameter may be: temperature of a medium within or outside the coiled tubing along the wellbore portion of the at least one first optical path; pressure of the medium; acoustic energy traveling within the medium; vibration within the medium; vibration along the coiled tubing; strain within the at least one first optical conductor along the wellbore portion of the at least one first optical path; and/or seismic activity around the wellbore.

The system may further comprise: at least one first electrical conductor disposed with the at least one first optical conductor within the coiled tubing and electrically connected between the downhole tool and at least one electrical, non-optical pathway of the rotary joint; and at least one second electrical conductor disposed with the at least one second optical conductor and electrically connected between the control system and the at least one electrical, non-optical pathway of the rotary joint. The at least one first electrical conductor and the at least one first optical conductor may each form portions of a single discrete cable carried with the coiled tubing. The at least one first electrical conductor, the at least one second electrical conductor, and the at least one electrical, non-optical pathway of the rotary joint may collectively provide at least one electrical telemetry path between the downhole tool and the control system. The at least one first electrical conductor, the at least one second electrical conductor, and the at least one electrical, non-optical pathway of the rotary joint may collectively form a portion of an electrical telemetry system operable for transmitting electrical communications from the control system to the downhole tool, and the at least one first optical conductor, the at least one second optical conductor, and the at least one optical pathway of the rotary joint may collectively form a portion of an optical telemetry system operable for transmitting optical communications from the downhole tool to the control system. Such implementations of the system may further comprise an electrical power source disposed at the wellsite surface, wherein the at least one first electrical conductor, the at least one second electrical conductor, and the at least one electrical, non-optical pathway of the rotary joint may collectively provide at least one electrical power transmission path from the electrical power source to the downhole tool. The system may further comprise an electrical power source disposed at the wellsite surface, wherein the at least one first electrical conductor, the at least one second electrical conductor, and the at least one electrical, non-optical pathway of the rotary joint may collectively provide: at least one electrical telemetry path between the downhole tool and the control system; and at least one electrical power transmission path from the electrical power source to the downhole tool.

The present disclosure also introduces a method comprising: rotating a reel of coiled tubing to convey a portion of the coiled tubing within a wellbore; entering instructions into a control system disposed at a wellsite surface from which the wellbore extends; and operating a communication system to transmit optical signals between the control system and the portion of the coiled tubing disposed within the wellbore via a rotary joint and a plurality of optical conductors, wherein the rotary joint is disposed in association with the reel and in optical communication with the plurality of optical conductors.

Operating the communication system to transmit the optical signals between the control system and the portion of the coiled tubing via the rotary joint and the plurality of optical conductors may occur simultaneously with rotating the reel of coiled tubing to convey the portion of the coiled tubing within the wellbore.

Rotating the reel may cause rotation of a rotatable portion of the rotary joint relative to a stationary portion of the rotary joint, wherein a first one of the plurality of optical conductors may be optically coupled between the rotatable portion and the portion of the coiled tubing disposed within the wellbore, and wherein a second one of the plurality of optical conductors may be optically coupled between the stationary portion and the control system.

The rotary joint may comprise a single optical pathway, and operating the communication system may further comprise operating the communication system to: transmit a first optical signal through the single optical pathway in a first direction; and transmit a second optical signal through the single optical pathway in a second direction opposite the first direction.

The rotary joint may comprise a plurality of optical pathways, and operating the communication system may further comprise operating an communication system to: transmit a first optical signal through a first one of the plurality of optical pathways in a first direction; and transmit a second optical signal through a second one of the plurality of optical pathways in a second direction opposite the first direction.

The method may further comprise operating a distributed sensing system to: communicate light pulses emitted by a light source through the plurality of optical conductors and the rotary joint; receive reflected light pulses reflected back through the plurality of optical conductors and the rotary joint to a signal processing unit disposed at the wellsite surface; and process the received reflected light pulses with the signal processing unit to determine values of a downhole parameter at locations distributed along the length of at least one of the plurality of optical conductors disposed in the wellbore. The downhole parameter may be: temperature of a medium within or outside the coiled tubing within the wellbore; pressure of the medium; acoustic energy traveling within the medium; vibration within the medium; vibration along the coiled tubing; strain within the at least one of the plurality of optical conductors disposed in the wellbore; and/or seismic activity around the wellbore.

A downhole tool may be attached to an end of the coiled tubing. In such implementations, rotating the reel of coiled tubing may comprise conveying the downhole tool within the wellbore, and operating the communication system may comprise operating the communication system to transmit the optical signals between the control system and the downhole tool via the rotary joint and the plurality of optical conductors. In such implementations, the method may further comprise operating an electrical power system to transmit electrical power from a wellsite electrical power source to the downhole tool via the rotary joint and a plurality of electrical conductors, wherein the rotary joint and the plurality of electrical conductors may collectively provide at least one electrical, non-optical power transmission path extending between the wellsite electrical power source and the downhole tool. The method may also or instead comprise operating an electrical telemetry system to transmit electrical signals between the control system and the downhole tool via the rotary joint and a plurality of electrical conductors, wherein the rotary joint and the plurality of electrical conductors may collectively provide at least one electrical, non-optical telemetry path extending between the wellsite electrical power source and the downhole tool. Operating the electrical telemetry system may comprise operating the electrical telemetry system to transmit the electrical signals from the control system to the downhole tool via the rotary joint and the plurality of electrical conductors, and operating the communication system may comprise operating the communication system as an optical telemetry system to transmit the optical signals from the downhole tool to the control system via the rotary joint and the plurality of optical conductors.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the implementations introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A system, comprising:
a reel disposed at a wellsite surface and containing coiled tubing, the reel having a reel junction box;
a downhole tool connected to the coiled tubing for conveyance within the wellbore via the coiled tubing, the downhole tool being in communication with a tool junction box;
a control system disposed at the wellsite surface, the control system having a control junction box;
a first optical conductor, a second optical conductor, a first electrical conductor, and a second electrical conductor, the first optical conductor and the first electrical conductor being disposed along the coiled tubing for conveyance within a wellbore; and
a rotary joint disposed in association with the reel for transmitting optical communications and electrical communications between the control system and the downhole tool, wherein the reel junction box is in communication with the rotary joint via transmission of optical communications and electrical communications, the first optical conductor and the first electrical conductor being coupled between the reel junction box and the tool junction box to provide optical communications and electrical communications between the reel and the downhole tool, the second optical conductor and the second electrical conductor being coupled between the rotary joint and the control junction box to provide optical communications and electrical communications between the control system and the rotary joint,
wherein the first electrical conductor and the second electrical conductor work in cooperation with the reel junction box and the rotary joint to provide an electrical return path to the control system.

2. The system of claim 1 wherein:
the rotary joint comprises:
a rotatable portion in optical communication with the first optical conductor; and
a stationary portion in optical communication with the second optical conductor; and
the system further comprises a third optical conductor that:
is disposed internal to the reel;
rotates with the rotatable portion;
is optically coupled between the first optical conductor and an optical pathway of the rotatable portion;
has a first end mechanically fixedly connected to the rotatable portion; and
has a second end mechanically fixedly connected to the first optical conductor.

3. The system of claim 1 wherein:
the rotary joint comprises:
a rotatable portion in optical communication with the first optical conductor; and
a stationary portion in optical communication with the second optical conductor; and
the rotary joint transmits the optical communications between the control system and a portion the first optical conductor disposed in the wellbore while the reel and the rotatable portion rotate relative to the stationary portion.

4. The system of claim 1 further comprising:
a light source disposed at the wellsite surface and operable to emit light pulses transmitted into the first optical conductor via at least the rotary joint, wherein a portion of the light pulses transmitted into the first optical conductor become reflected light pulses that are transmitted back along the first optical conductor and through the rotary joint, and wherein the reflected light pulses are indicative of a downhole parameter; and
a signal processing unit disposed at the wellsite surface and operable to receive and process the reflected light pulses to determine values of the downhole parameter at locations distributed along the length of the first optical conductor within the wellbore.

5. The system of claim 4 wherein the light source and signal processing unit are cooperatively operable to determine the downhole parameter values while the reel rotates relative to the wellsite surface.

6. The system of claim 1 wherein the rotary joint comprises:
a first optical pathway transmitting optical communications transmitted from the control system to the first optical conductor but not optical communications transmitted from the first optical conductor to the control system; and
a second optical pathway transmitting optical communications transmitted from the first optical conductor to the control system but not optical communications transmitted from the control system to the first optical conductor.

7. The system of claim 1 wherein the first optical conductor, the second optical conductor, and the rotary joint form a portion of an optical telemetry system operable for optical telemetry between the downhole tool and the control system.

8. The system of claim 1 wherein the control system and the downhole tool each comprise an optical communication module operable to convert the optical communications into electrical signals and to convert electrical signals into the optical communications.

9. The system of claim 1 wherein the first and second electrical conductors and the electrical, non-optical pathway of the rotary joint collectively provide an electrical telemetry path between the downhole tool and the control system.

10. The system of claim 1 wherein the first electrical conductor, the second electrical conductor, and an electrical, non-optical pathway of the rotary joint collectively form a portion of an electrical telemetry system operable for transmitting electrical communications from the control system to the downhole tool, and wherein the first optical conductor, the second optical conductor, and the rotary joint collectively form a portion of an optical telemetry system operable for transmitting optical communications from the downhole tool to the control system.

11. The system of claim 1 further comprising an electrical power source disposed at the wellsite surface, wherein the first and second electrical conductors and an electrical, non-optical pathway of the rotary joint collectively provide an electrical power transmission path from the electrical power source to the downhole tool.

12. The system of claim 1 further comprising:
the first electrical conductor disposed with the first optical conductor within the coiled tubing and electrically connected between the downhole tool and a first electrical, non-optical pathway of the rotary joint;
wherein the second electrical conductor is disposed with the first optical conductor within the coiled tubing and electrically connected between the downhole tool and a second electrical, non-optical pathway of the rotary joint;

a third electrical conductor disposed with the second optical conductor and electrically connected between the control system and the first electrical, non-optical pathway of the rotary joint;

an electrical power source disposed at the wellsite surface; and a fourth electrical conductor disposed with the second optical conductor and electrically connected between the electrical power source and the second electrical, non-optical pathway of the rotary joint;

wherein the first and third electrical conductors and the first electrical, non-optical pathway of the rotary joint collectively provide an electrical telemetry path between the downhole tool and the control system; and wherein the second and fourth electrical conductors and the second electrical, non-optical pathway of the rotary joint collectively provide an electrical power transmission path from the electrical power source to the downhole tool.

13. The system of claim 1, wherein the downhole tool is configured to perform at least one downhole operation.

14. The system of claim 1, wherein the second electrical conductor comprises an outer metal tube surrounding the cable.

15. A method, comprising:
rotating a reel of coiled tubing to convey a portion of the coiled tubing, and a downhole tool connected to the coiled tubing, within a wellbore, the reel having a rotary joint disposed in association therewith;

entering instructions into a control system disposed at a wellsite surface from which the wellbore extends;

operating a communication system to transmit optical signals, via the rotary joint and a plurality of optical conductors, between the control system, the portion of the coiled tubing disposed within the wellbore, and the downhole tool;

operating a power system to transmit electrical power, via the rotary joint and a plurality of electrical, non-optical conductors, from a power source at a wellbore surface to the downhole tool, wherein the rotary joint is disposed in association with the reel and in optical communication with the plurality of optical conductors and in electrical communication with the plurality of electrical conductors, wherein an electrical return path for the power system comprises at least one electrical conductor of the plurality of electrical conductors; and utilizing a tool junction box in communication with the downhole tool, a reel junction box disposed in the reel, and a control junction box of the control system to transfer both optical communication and electrical communication along the plurality of optical conductors and the plurality of electrical conductors to enable communication between the control system and the downhole tool during rotation of the reel.

16. The method of claim 15 wherein:
operating the communication system to transmit the optical signals between the control system and the portion of the coiled tubing via the rotary joint and the plurality of optical conductors occurs simultaneously with rotating the reel of coiled tubing to convey the portion of the coiled tubing within the wellbore; and rotating the reel causes rotation of a rotatable portion of the rotary joint relative to a stationary portion of the rotary joint, wherein a first one of the plurality of optical conductors is optically coupled between the rotatable portion and the portion of the coiled tubing disposed within the wellbore, and wherein a second one of the plurality of optical conductors is optically coupled between the stationary portion and the control system.

17. The method of claim 15 further comprising operating a distributed sensing system to:
communicate light pulses emitted by a light source through the plurality of optical conductors and the rotary joint;

receive reflected light pulses reflected back through the plurality of optical conductors and the rotary joint to a signal processing unit disposed at the wellsite surface; and process the received reflected light pulses with the signal processing unit to determine values of a downhole parameter at locations distributed along a length of at least one of the plurality of optical conductors disposed in the wellbore.

18. The method of claim 15 further comprising performing at least one downhole operation in the wellbore with the downhole tool.

* * * * *